US009470573B2

(12) United States Patent
Ignatian et al.

(10) Patent No.: US 9,470,573 B2
(45) Date of Patent: Oct. 18, 2016

(54) LEAK SENSOR FOR A PROVER

(71) Applicants: Alexander Ignatian, Phoenix, AZ (US); Gary Cohrs, Sun Lakes, AZ (US)

(72) Inventors: Alexander Ignatian, Phoenix, AZ (US); Gary Cohrs, Sun Lakes, AZ (US)

(73) Assignee: FLOW MANAGEMENT DEVICES, LLC, Phoenix, AZ (US)

( * ) Notice: Subject to any disclaimer, the term of this patent is extended or adjusted under 35 U.S.C. 154(b) by 613 days.

(21) Appl. No.: 13/874,129

(22) Filed: Apr. 30, 2013

(65) Prior Publication Data

US 2014/0318238 A1 Oct. 30, 2014

(51) Int. Cl.
G01F 23/60 (2006.01)
G01M 3/32 (2006.01)
G01F 25/00 (2006.01)

(52) U.S. Cl.
CPC ............ G01F 23/60 (2013.01); G01M 3/3245 (2013.01); *G01F 25/0015* (2013.01)

(58) Field of Classification Search
CPC ....................................................... G01F 23/60
USPC .......................................................... 73/308
See application file for complete search history.

(56) References Cited

U.S. PATENT DOCUMENTS

| 4,372,147 | A | * | 2/1983 | Waugh | G01F 25/0015 |
| | | | | | 73/1.17 |
| 6,578,602 | B1 | * | 6/2003 | Kirschner | A62C 35/68 |
| | | | | | 137/312 |
| 7,650,775 | B2 | | 1/2010 | Ignatian | |
| 8,161,791 | B2 | | 4/2012 | Ignatian | |
| 8,196,446 | B2 | | 6/2012 | Ignatian | |
| 8,205,479 | B2 | | 6/2012 | Ignatian | |
| 2003/0024489 | A1 | * | 2/2003 | Balan | C25B 15/02 |
| | | | | | 123/3 |

* cited by examiner

*Primary Examiner* — Hezron E Williams
*Assistant Examiner* — David Z Huang
(74) *Attorney, Agent, or Firm* — Von Hellens & Bycer Law Firm; Matthew L. Bycer; C. Robert von Hellens

(57) ABSTRACT

A leak sensor for sensing fluid flow through the bearings and seals about a shaft extending from a prover. Any leakage of fluid through the bearings and seals will migrate into the annular cavity within a housing and surrounding the shaft. A conduit or passageway in fluid communication with the annular cavity conveys the leaking fluid into a collection chamber. A float within the collection chamber will trigger an electrical or mechanical signal when the float rises a preset distance. If electrical, the signal is transmitted to an alarm unit to trigger a warning indicative of the amount of fluid in the collection chamber.

1 Claim, 2 Drawing Sheets

LEAK SENSOR FOR A PROVER

BACKGROUND OF THE INVENTION

1. Field of the Invention

The present invention relates to provers and, more particularly, to a sensor for detecting the rate and quantity of leaks about the translating shaft extending from the prover.

2. Description of Related Prior Art

U.S. Pat. Nos. 7,650,775 and 8,161,791 are owned by Flow Management Devices, LLC, the present Assignee. As the present invention is related to an important addition to provers of the type described in these two patents, both patents are incorporated herein by reference.

A purpose of a prover is to determine the quantity of fluid flowing therethrough. As a result, the measurements relating to such quantity of fluid must be extremely precise. To achieve this end, fluid flows in one end of a cylinder, which cylinder includes a piston rectilinearly translatable from a location proximate one end of the cylinder to a location proximate the other end of the cylinder. After translation of the piston, the fluid flows out of the other end of the cylinder. The piston is supported upon a shaft extending from each end of the cylinder and is supported by sealed bearings, seals and bearings, or the like. Leakage of fluid through the seals will have an impact upon the fluid flow measurements being undertaken. Such leakage is unacceptable if in excess of a small quantity per time.

If leakage beyond an acceptable quantity/rate occurs, the seals attendant the translating shaft must be replaced. Such replacement is not only expensive in terms of time to effect the repair but more importantly, the downtime of the prover is generally far more critical and fiscally devastating.

Some leakage through the sealed bearings attendant the shaft is likely to occur over time. When the leakage per time exceeds a predetermined amount, repair must be undertaken to maintain the integrity of the measurements provided by the prover.

None of the known prior art is capable of determining the quantity of leakage per time, other than in a very gross manner as a function of accumulation of the fluid on a surface beneath the leaking bearing.

SUMMARY OF THE INVENTION

The present invention includes a housing disposed at the outlet end of a cylinder and surrounding the shaft extending from a prover. Sealed bearings or bearings and seals are disposed about the shaft at the end of the cylinder. Leakage of fluid through the sealed bearings in communication with the interior of the prover is collected within an annular cavity about the shaft in the housing. A conduit extends from the annular cavity to a collection chamber. A liquid level sensor within the collection chamber provides a mechanical or an electrical signal reflective of the amount of fluid collected therein. This signal may be used to trigger an alarm, interface with communication or monitoring equipment or otherwise provide an indication of the level of fluid within the collection chamber. If an alarm occurs, appropriate maintenance and repair operations can be undertaken. A valve in fluid communication with the collection chamber accommodates draining of the collection chamber from time to time.

It is therefore a primary object of the present invention to provide an indication of the amount of fluid leakage through bearings supporting a shaft of a prover.

Another object of the present invention is to provide a collection chamber for collecting leakage of fluid through sealed bearings supporting the shaft of a prover.

Yet another object of the present invention is to provide a simple mechanical device for collecting fluid leaking through sealed bearings of a translatable shaft.

Still another object of the present invention is to provide a determination of whether the rate of leakage of a fluid through sealed bearings surrounding a translating shaft is within acceptable limits.

A further object of the present invention is to provide an electrical signal when fluid leakage through a sealed bearing supporting a shaft of a prover reaches a predetermined amount.

Yet another object of the present invention is to provide a method for monitoring the leakage rate of a fluid through a sealed bearing supporting a translating shaft of a prover.

A still further object of the present invention is to provide an electrical or visible signal when the quantity of fluid leakage through a sealed bearing supporting a translating shaft of a prover reaches a predetermined amount.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DESCRIPTION OF THE PREFERRED EMBODIMENT

Figure 1:
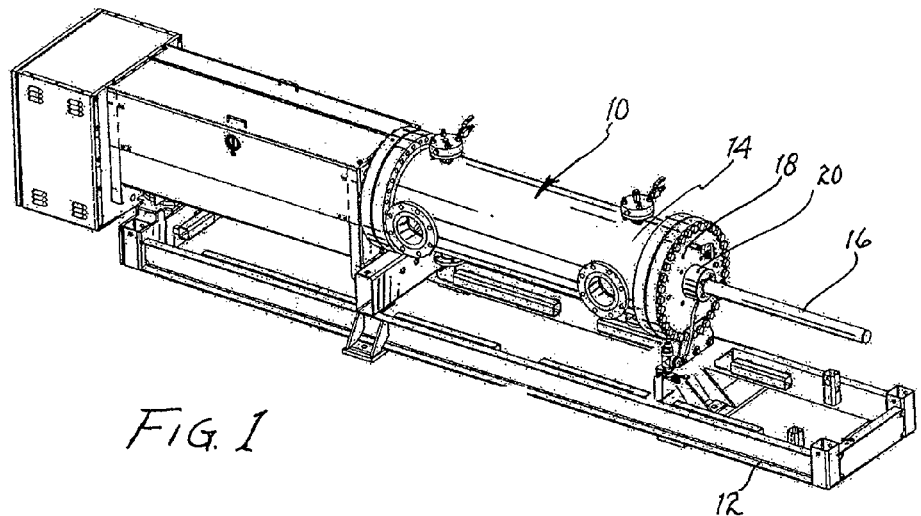
FIG. 1 illustrates a prover mounted on a frame and having a leak sensor encircling the shaft protruding from the prover.

Referring to FIG. 1, there is shown a prover 10 of the type described and illustrated in U.S. Pat. Nos. 7,650,775 and 8,161,791, which patents are assigned to the present Assignee. The prover is mounted on a framework 12. The prover includes a cylinder 14 enclosing a piston secured to a shaft 16. The movement of the piston along the longitudinal axis of cylinder 14 results in rectilinear translation of shaft 16 commensurate with movement of the piston. End plate 18 of the cylinder supports a housing 20. The housing includes sealed bearings and/or bearings and seals supporting shaft 16 and preventing leakage of fluid from within cylinder 14 about the surface of shaft 16.

Should such fluid leakage be in excess of a relatively small quantity over a period of time, the accuracy of prover 10 may be compromised. Since it is essentially impossible for practical reasons to completely eliminate any fluid leakage, it becomes important to determine the quantity of leakage over time.

Housing 20, along with the bearings and seals disposed therein, accommodates rectilinear translation of shaft 16. As some leakage of fluid is likely to occur, it is important to determine both the quantity and rate of leakage of fluid from within cylinder 14.

Referring jointly to FIGS. 2, 3, 4 and 5, apparatus is illustrated and will be described which collects any leakage of fluid and senses the quantity of fluid that has leaked.

Figure 2:
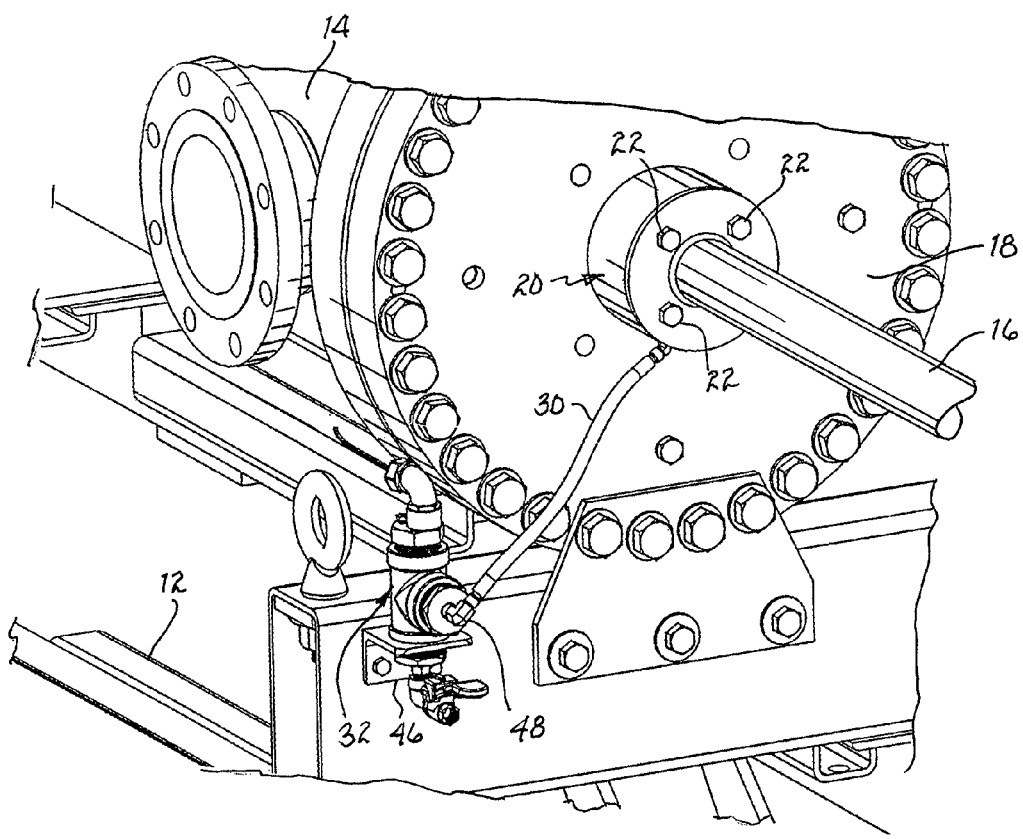
FIG. 2 illustrates a detailed view of the leak sensor mounted on the prover.

FIG. 2 is a partial view of the end of prover 10 showing a part of cylinder 14, end plate 18, housing 20 and framework 12. A conduit 30 extends from the housing to a collection chamber 32 for collecting fluid leaking into housing 20 and conveyed to the collection chamber via the conduit.

Figure 3:
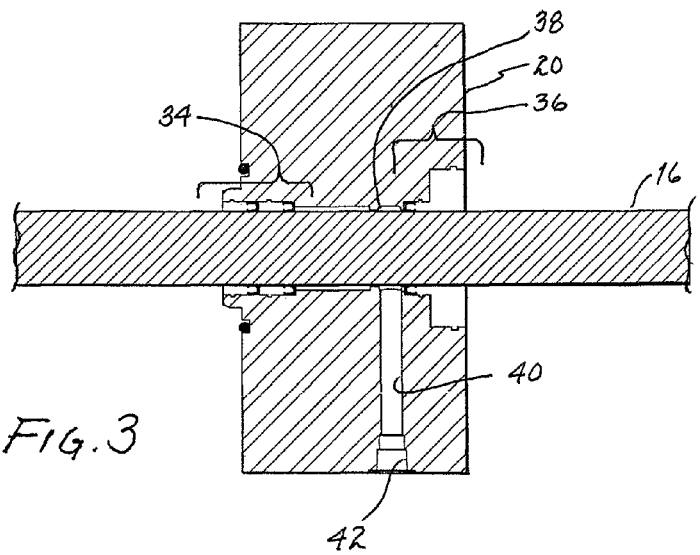
FIG. 3 is a cross-sectional view of the leak sensor illustrating the flow path of any fluid leaking from the sealed bearings about the shaft.

Referring to FIG. 3, there is shown a cross-sectional view of housing 20 and shaft 16. A plurality of bearings/seals 34, 36 (may be referred to collectively as a seal assembly) extending about shaft 16 are representatively illustrated. An annular cavity 38 is formed about the shaft within housing 20 to collect any fluid leaking/seeping through bearings/seals 34, 36. A passageway 40 is in fluid communication with annular cavity 38 and will drain any fluid collected within the annular cavity. Outlet 42 is in sealed engagement with conduit 30 (see FIG. 2). Accordingly, any fluid flowing into annular cavity 38 will flow downwardly through passageway 40 and into conduit 30 under the force of gravity if the fluid is of relatively low viscosity. If the fluid is of relatively high viscosity, the pressure within the housing due to translation of the piston within the prover and leakage through the seals will cause flow of the high viscosity fluid into the annular cavity through passageway 40 and into conduit 30.

Figure 4:
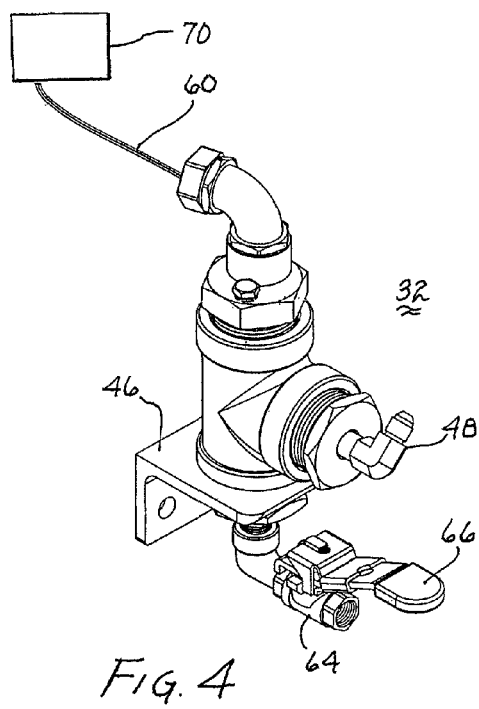
FIG. 4 illustrates a collection chamber for receiving any leaking fluid.
Figure 5:
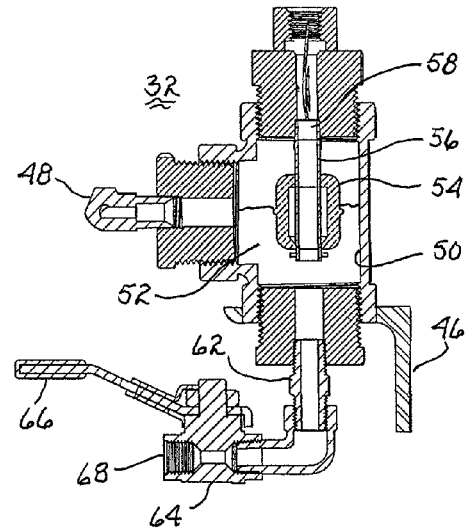
FIG. 5 is a cross-sectional view of the collection chamber.

As particularly shown in FIGS. 2, 4, and 5, collection chamber 32 is secured to framework 12 through a bracket 46, or the like. The collection chamber includes an inlet fitting 48 engaged with conduit 30. Thereby, any fluid flowing through the conduit will enter fitting 48 and flow into chamber 50 within collection chamber 32. As fluid collects within the chamber, representatively identified by numeral 52, a float 54 slidably supported upon a tube 56 will rise as the level of fluid increases. A sensor, representatively identified by numeral 58, senses the position of float 54. The sensor may be a switch and emit an electrical signal as a function of a predetermined position or a varying position of the float. This signal is transmitted through electrical conductors 60 to an alarm unit 70 to advise an operator that a predetermined amount of fluid has flown into chamber 50. Alternatively, the sensor may provide a flag, light or other visible signal when the float is at a predetermined position.

From time to time, it may be prudent to empty chamber 50. A pipe 62, or the like, is in fluid communication with chamber 50 and conveys the fluid to a valve 64. Preferably, the valve includes a manually operated lever 66 for opening the valve and draining fluid from within chamber 50 through outlet 68. It is to be understood that outlet 68 may be connected to a pipe or the like for conveying the discharged fluid to a collection point.

While it is shown that housing 20 is cylindrical and attached to end plate 18 by bolts 22, the housing may be of other configuration. Moreover, it may be partially inserted within end plate 18 or it may be located on the interior surface of the end plate. Similarly, collection chamber 32 may be located anywhere in proximity to the prover as a function of practicality and convenience for an operator.

Under some circumstances, the collection chamber may be located within or as a part of housing 20. Similarly, the sensor may be located within the housing and provide a visible signal or an electrically generated signal. Necessarily, the capability for draining the collection chamber must be provided. The illustrated and described conduit may be simply a passageway, such as passageway 40, within the housing interconnecting the annular cavity with the collection chamber.

We claim:

1. A leak sensor for sensing leakage of fluid from within a prover through bearings supporting a rectilinearly translatable shaft, said leak sensor comprising:
(a) an annular cavity disposed within a housing and about the shaft adjacent a seal assembly, said housing being cylindrical and attached to an end plate of the prover for housing the seal assembly, the shaft and said annular cavity, said cylindrical housing including a passageway in fluid communication with said annular cavity;
(b) a conduit extending from said passageway for discharging fluid from said annular cavity;
(c) a collection chamber in fluid communication with said conduit for receiving and collecting fluid from said conduit;
(d) a float disposed within said collection chamber positionally responsive to the quantity of fluid collected within said collection chamber;
(e) a sensor for sensing the position of said float and for triggering a signal; and
(f) electrical conductors for transmitting the signal to an alarm unit.

* * * * *